(12) United States Patent
Sagrati, Jr. et al.

(10) Patent No.: US 6,375,883 B1
(45) Date of Patent: Apr. 23, 2002

(54) METHOD FOR MAKING A CURED ARTICLE USING AN ADIABATIC MOLD

(75) Inventors: John Victor Sagrati, Jr., East Aurora; Russell Anthony Thomas, Buffalo, both of NY (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/390,037

(22) Filed: Sep. 3, 1999

Related U.S. Application Data

(62) Division of application No. 08/995,888, filed on Dec. 22, 1997, now Pat. No. 6,093,013.

(51) Int. Cl.⁷ .............................................. B29C 39/26
(52) U.S. Cl. .................. 264/213; 264/214; 264/220; 264/299
(58) Field of Search ............................. 425/470, 403, 425/471; 249/111, 115, 117, 134; 264/213, 214, 220, 280, 299, 319

(56) References Cited

U.S. PATENT DOCUMENTS

| | | | |
|---|---|---|---|
| 4,183,991 A | 1/1980 | Smiley et al. | 428/220 |
| 4,623,499 A | 11/1986 | Fuma et al. | 264/83 |
| 4,980,112 A | 12/1990 | Masters | 264/310 |
| 5,260,014 A | 11/1993 | Holton et al. | 264/134 |
| 5,275,547 A | 1/1994 | Brown | 425/129.1 |
| 5,514,320 A | 5/1996 | Bright | 264/266 |
| 5,554,713 A | 9/1996 | Freeland | 528/76 |
| 6,093,013 A | * 7/2000 | Sagrati et al. | 249/111 |

FOREIGN PATENT DOCUMENTS

| | | |
|---|---|---|
| JP | 4-236207 | 8/1992 |
| JP | 7-220637 | 8/1995 |
| JP | 7-259226 | 10/1995 |
| JP | 8-25428 | 1/1996 |
| JP | 08267466 | 10/1996 |
| RU | 512078 | 4/1976 |
| ZA | 69/6203 | 8/1969 |

* cited by examiner

Primary Examiner—Mark Eashoo
(74) Attorney, Agent, or Firm—Andrew G. Golian

(57) ABSTRACT

The present invention relates to a mold for a chemically curable composition including a first shell component, a second shell component and a honeycomb core interposed therebetween. The invention further relates to providing an essentially adiabatic environment for chemically cured compositions using the previously described mold.

26 Claims, 3 Drawing Sheets

METHOD FOR MAKING A CURED ARTICLE USING AN ADIABATIC MOLD

This is a division of application Ser. No. 08/995,888 filed Dec. 22, 1997 now U.S. Pat. No. 6,093,013.

BACKGROUND OF THE INVENTION

1. Field of Invention

This invention relates to an adiabatic mold made from a composite material. It is particularly directed to such molds used for the curing of chemically curable compositions.

2. Description of the Related Art

Chemically curable compositions are generally formed into shapes and allowed to cure, or harden, via chemically-induced polymerization and/or crosslinking reactions. The shaping process can be accomplished by molding, such as injection molding, compression molding, cell casting and the like. Sheet materials can be obtained by cell casting (a batch mode) or by continuous casting or molding onto a conveyor belt or belt press.

During the curing process, loss of heat to the surrounding materials and to the environment retards reaction kinetics. This can result in longer curing times and can decrease resulting physical properties. The materials that are used for molds, conveyor belts and other containing structures are typically metals, frequently aluminum or steel, or thick reinforced resin-impregnated fabrics. These absorb heat generated by the chemical curing reaction and generally must be heated or preheated in order to achieve satisfactory curing. Further, the resins are often degraded by heat, and the structures can be used only a limited number of times.

The primary function of a mold is to hold the desired shape while the composition cures. In order to maintain the shape and tolerance, the mold must have sufficient structural rigidity. Typically, support for conventional molds is made up of wood or metal bracing which adds mass, potentially increasing the volumetric heat capacity of the mold. In addition, such typical support increases the complexity of the mold's construction. The structural complexity is especially visible in molds for making shapes. The complex bracing required often require multiple pieces of, for example, ply wood, constructed to surround the shaped mold to retain the structural integrity of the mold.

SUMMARY OF THE INVENTION

This invention is directed to an essentially adiabatic mold made from a composite structure having low thermal conductivity and an exposed shell component having a low heat capacity per unit area, that can be used in the curing of chemically curable compositions.

In one embodiment, the mold is a structure for cell casting sheet or shaped articles from chemically curable compositions. In another embodiment, the mold is a belt for the continuous casting of sheet material from chemically curable compositions.

The mold of the invention are made from a composite structure which comprises an exposed shell component, a barrier shell component, and a honeycomb core interposed therebetween. At least the upper shell of the mold is exposed to the chemically curable composition. The composite structure has a thermal resistance (R value) of at least about 1.0 ft$^2$-° F.-hr/Btu (about 0.19 m$^2$-° K/W) and preferably about 3.85 ft$^2$-° F.-hr/Btu (about 0.677 m$^2$-° K/W). In order to retard heat absorption, the exposed shell component should preferably have a thickness that results in a low heat capacity per unit area value for the exposed shell component. Where the curable composition is a methyl(meth)acrylate composition, the heat capacity per unit area is should be less than about 14,500 Joules/° K-m$^2$("J/° K-m$^2$) preferably less than about 8000 Joules/° K-m$^2$[2], more preferably less than about 6000 Joules/° K-m$^2$, even more preferably less than about 1400 Joules/° K-m$^2$. Low energy absorption of the of the exposed shell component is complementary to thermal resistance of the composite structure making up the mold. In a preferred embodiment, the exposed shell component further comprises a release surface.

The invention is further directed to a method for making a cured article, comprising the steps of (a) placing a chemically curable composition on a mold as described above; (b) allowing the composition to cure, wherein no heat is added to the composition or to the mold; and (c) removing the cured article from the mold.

The invention itself, together with further objects and attendant advantages, will best be understood by reference to the following detailed description, taken in conjunction with the accompanying drawings.

DETAILED DESCRIPTION OF THE PREFERRED EMBODIMENTS

Figure 1:
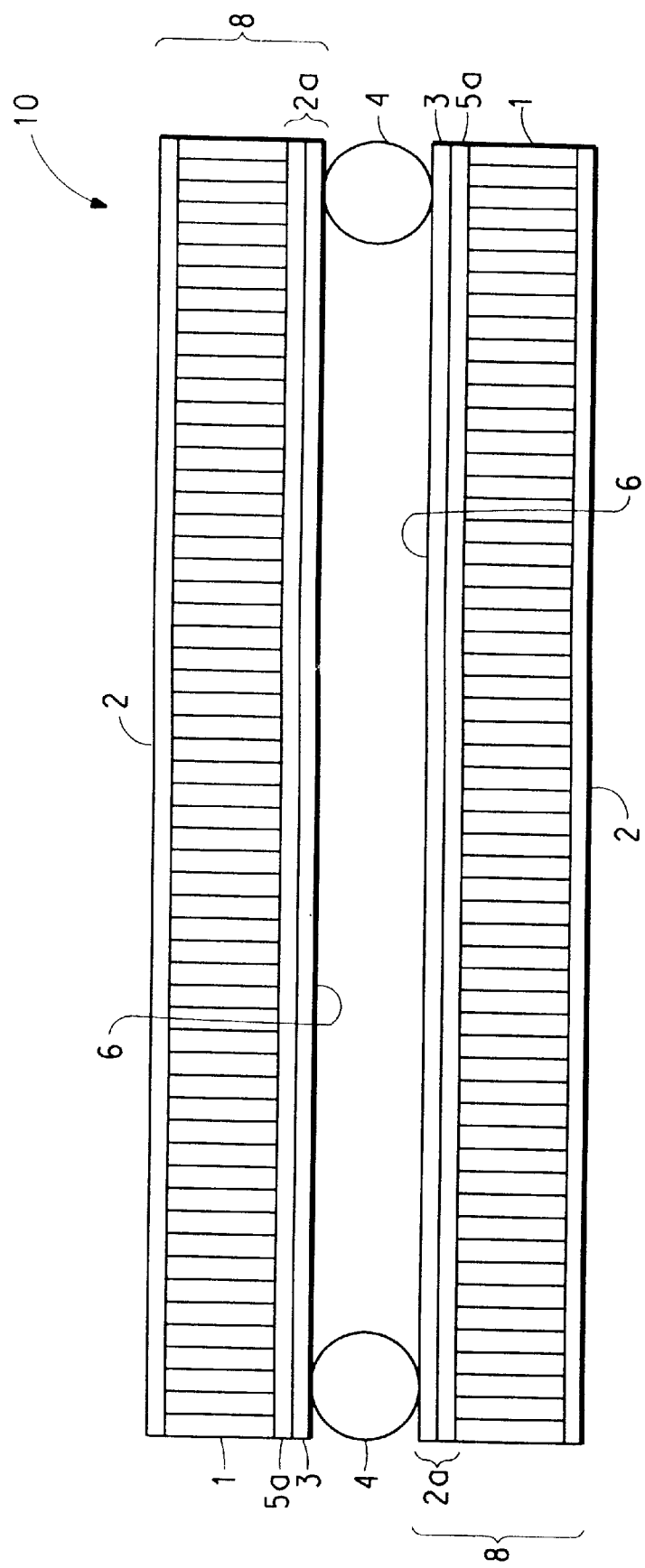
FIG. 1 is a cross-sectional view of a sheet mold.

It is recognized that while the molds of the invention are not perfectly adiabatic, they function in a nearly adiabatic way, in that the mold of the present invention allows for complete chemical curing of a composition without the addition of heat. A measurement of the percentage of monomers left after curing ("residual monomers") indicates the amount of curing that occurred: the lower the percentage of residual monomer, the more complete the curing. The term "mold" as used herein is intended to mean any structure which is used to support, contain and/or confine a curable composition during the curing process. It includes molds for making three-dimensional, nonlinear structures ("shaped molds"), cells for making sheet materials, belts for the continuous casting of sheet materials, and the like. The term "chemically curable" as used herein is intended to mean compositions which do not require the continuous input of heat during the curing process. Often, this type of curing process is exothermic. It includes compositions in which the curing is initiated by the addition of one component to another, and compositions in which the curing is initiated by a preheating step. Compositions of the latter type generally have dual initiator systems.

The molds of the invention are useful in the curing of chemically curable compositions. The molds are made from a composite structure comprising a core of a honeycomb structure covered by an exposed shell component and a barrier shell component. The term "honeycomb structure" is intended to mean a structure including a plurality of continuous, open cells defined by an associated plurality of cell walls. The term "shell component" is intended to mean a continuous covering of the open ends of the honeycomb core. In a planar structure, the shell is perpendicular to the cell walls of the honeycomb core.

The honeycomb core can be made of any material which will retain the cell shape. Examples of suitable core materials include "Kraft paper" (paper-type support with dry release layer), cardboard, polyaramid paper such as Nomex® (E. I. du Pont de Nemours and Company, Wilmington, Del.), fiberglass and carbon composite materials. Almost any cell geometry can be used, including circular, oval, polygonal and corrugated. Honeycomb materials having hexagonal cells are well known. It is also possible to have cells which are flat on one side, for example, a semi-circle. While most honeycomb materials will have the same cell geometry throughout, it is possible to have more than one geometry in the core material. The cell size, measured as the largest cell diameter, is dictated by the desired compressive strength of the structure in combination with the desired density. Commercially available honeycomb materials have cell sizes in the range of 3.1 to 38 mm with densities of 0.016 to 0.144 g/cc. It is preferred that the cell size be less than about 10 mm. The thickness of the cell wall can vary over a wide range, again dictated by the desired compressive strength in combination with the desired density.

The composite structure can comprise a core made of one or more layers of faced honeycomb to increase structural integrity and thermal resistance. Faced honeycomb having cell walls with hexagonal configuration (or sandwich structure), is well known, and commercially available. These commercially available sandwich structures are faced on both sides with one or more plies of resin-impregnated fabric. Individual sandwich layers can be joined together by, for example, lamination with one or more additional plies of resin-impregnated fabric interposed therebetween.

The thickness of the honeycomb core, i.e., the total thickness of all the faced or unfaced honeycomb layers making up the core between the exposed and barrier shell components, depends on the nature of the mold. Thickness of the core affects the desired thermal properties of the mold. The thicker the core the higher the R value of the composite structure. Further, the core thickness affects the structural integrity of the composite structure. The greater the thickness the higher the rigidity. For a mold useful for a curable composition including methyl(meth)acrylate, a core of Nomex® material having a thickness of less than or equal to about 3.81 cm (1.5 inches) is often used.

For planar structures, such as belts, the total core thickness is preferably in the range of about 0.5 cm to about 10 cm, more preferably from about 0.635 cm to about 3.81 cm. For three-dimensional, nonlinear, structures, the total core thickness will vary from at least about 0.635 cm, depending on how the mold is made.

The exposed shell component (or first shell component) of the mold is the surface closest to the curable composition during the curing process. The exposed shell component is a continuous layer that covers the open cells of the core on one side. The material making up the exposed shell component should be stable at the temperatures at which the curing reaction takes place, typically 50 to 150° C. Examples of suitable upper shell materials include fabrics and papers, such as those made of polyaramids, fiberglass and the like; composite pre-pregnated materials ("prepreg materials") comprised of a matrix of oriented fibrous material such as graphite, polyaramid, boron, fiberglass and the like impregnated with an epoxy, phenolic, or other similar organic resinous material; films such as fluoropolymers, polyimides, polyesters and the like. The resin is preferably one which is thermally stable at the maximum temperatures generated by the heat of reaction of the chemically curable composition. The exposed shell component may also include metals such as, for example, aluminum, steel, stainless steel and combinations thereof.

The upper shell can be made up of more than one layer of materials, including multiple layers of the materials described above. Such layers are generally referred to as "plies", so that the shell can be a one-ply structure, a two-ply structure, etc. The shell can include an adhesive layer to promote the adhesion of the shell to the core. The adhesive should be thermally stable at the maximum temperatures reached by the curing reaction. Examples of adhesives are well known in the art. Typical adhesive systems include polyester, epoxy, modified epoxy, acrylic, phenolics, polyimides, polyurethanes and fluorocarbons. The shell can include a release layer, on at least the surface exposed to the cured composition, to facilitate removal of the cured article after the curing process. The release material should be thermally stable at the temperatures reached by the curing reaction, and must be chemically inert to the curable composition. Examples of materials are well known in the art and include silicones, silicone rubbers, polyethylene, poly (vinyl chloride), poly(vinyl fluoride), poly(vinyl alcohol), polyethyleneterethalate (PET), fluoropolymers and the like. A layer of the release material can be bonded to the surface of the facing layer in the exposed shell component that is exposed to the curable composition ("exposed surface"), or, alternatively, a coating of the release material can be applied to the exposed surface of the exposed shell component. Where the release material is coating, it may be reapplied during the useful life of the mold.

In another embodiment of the invention, the release material itself can be the facing layer of the exposed shell component. The release material is the facing layer of the exposed shell component, a preferred release material is poly(vinyl)fluoride that has been thermoformed prior to mold construction.

The thickness of the exposed shell component is a balance between maximizing the structural rigidity and minimizing the heat capacity per unit area of the material next to the cured composition. The exposed shell component should not absorb a significant amount of heat from the curing reaction. By "significant amount of heat," it is meant that the heat absorbed would reduce the reaction kinetic of the curing reaction so as to cause incomplete curing to occur. The desired thickness of the exposed shell component can be determined by calculating heat capacity per unit area of the material for a particular thickness, and calculating the heat loss from the curing reaction, and ascertaining whether the heat loss would cause incomplete curing for a particular curable composition. As used herein, the term "heat capacity per unit area," $C_{p-A}$, of the exposed shell component can be calculated by Equation (I) below:

Equation (I)

$$C_{p-A} = (\text{thickness}) \times Cp$$

wherein:
  Cp=volumetric heat capacity of the exposed shell component; and
  thickness=thickness of the exposed shell component The greater the exposed shell component thickness, the greater the structural rigidity of the composite structure or mold, but the heat capacity per unit area is also increased. It is understood that the desired thickness of the exposed shell component may vary with the curable composition. Some curable compositions can complete curing even with a relatively large heat capacity per unit area, while other curable composition are more sensitive to a material with high heat capacity per unit area.

Where the mold is used for a methyl(meth)acrylate curable composition, the exposed shell component may have a heat capacity per unit area of less than about 14,500 Joules/° K-m², preferably less than about 8000 Joules/° K-m², more preferably less than about 6000 Joules/° K-m², even more preferably less than about 1400 Joules/° K-m². In general, the mold of the present invention for curing methyl(meth) acrylate preferably has a total upper shell thickness, i.e., the sum of the thicknesses of all the layers, between about 0.1 mm and about 1.5 mm. In a more preferred embodiment a two-ply shell can be used for the exposed shell component, having a total thickness between about 0.2 mm and about 0.8 mm.

The barrier shell component (or second shell component) is a continuous layer that covers the open cells of the core on the side opposite the exposed shell component. The barrier shell component can be any material which will prevent the cells from being crushed on the lower side.

The barrier shell component can comprise one or more layers or plies of material. The thickness of the barrier shell component and the material making up the barrier shell component are not critical. The thickness of the barrier shell component protects the honeycomb core, contributes to the structural rigidity, and further contributes to the weight of the mold. Generally, it is preferred that the total thickness of the lower shell, i.e., the sum of the thickness of all the layers, be at least about 0.1 mm, more preferably at least about 0.2 mm.

Where the composite structure includes a core having plurality of layers of honeycombs, each layer may be directed bonded to each other or faced with facing layers wherein the facing layers are bonded to each other.

It is further understood that the number of composite structures used to construct a mold of the present invention is may vary, so long as the objects of the present invention are achieved.

Shaped molds can be formed by a variety of techniques. The shaped molds can be formed during or after the fabrication of the individual composite structure. Common mold making techniques include forming processes involving machining, vacuum forming, vacuum bagging, autoclaving, compression molding, etc., or combinations of one or more of these techniques with each other. A number of common mold making techniques are described in *Encyclopedia of Polymer Science and Engineering* (2nd Ed., John Wiley & Sons, New York) ("*Polymer Science and Engineering* Encyclopedia") vol. 14, p. 382, vol. 7, p. 753 and vol. 16, pp. 810–811, the contents of which are incorporated herein by reference.

For example, the shaped molds can be constructed by bonding together multiple layers of fabricated composite structures to form a block, and machining the block into the desired shape. The fabricated composite structures can be bonded by conventional adhesives such as, for example, the same or different adhesive selected from the list above used to bond the shell component and honeycomb core. Alternatively, the honeycomb cores can be stacked and bonded to each other such that the upper and barrier shell components are placed only on the outer surfaces of the block. The machined surface can then be covered by an release material, as described above, to form a smooth surface. Further descriptions of stacking can be found in the *Polymer Science and Engineering* Encyclopedia, vol. 7, pp. 746–753, the content of which is incorporated herein by reference.

Alternatively, the shaped molds can be made by forming techniques, preferably by vacuum forming. The general steps can include coating components of the prefabricated composite structure with uncured resins, placing all the coated components around the desired shape, pulling a vacuum to draw the them down to the exact shape, and allowing the resins to cure by, for example heating, to set the shape.

FIG. 1 shows a cross-sectional view of a mold of the invention which can be used to form sheet materials. The mold 10 is includes a composite structure 8 comprising a honeycomb core, 1, The open surfaces of the core are covered by a barrier shell component 2 including a lower facing sheet, 5, and an exposed shell component 2a including an upper facing sheet, 5a, which facing sheets are sheets of fiber-filled reinforced resinous material. The exposed shell components includes a surface 6 that is exposed to the cured composition (not shown) being housed by the mold. The exposed shell component further includes a release layer, 3 on the exposed surface 6. Optionally, gaskets, 4, are placed in the mold to keep the liquid curable material within the mold 10.

Figure 2:
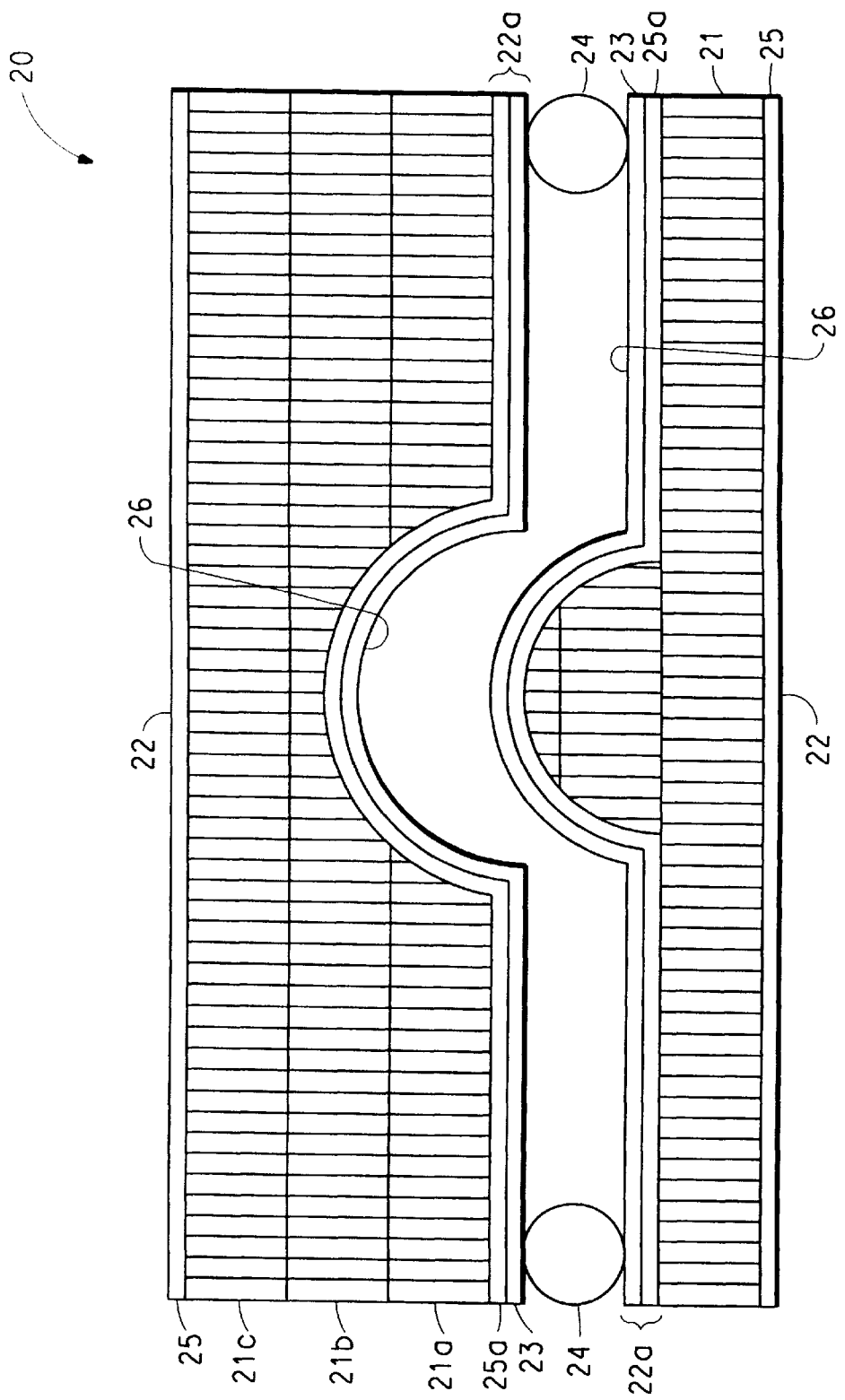
FIG. 2 is a cross-sectional view of a shaped mold including stacked plies of faced honeycomb structures.

FIG. 2 shows a cross-sectional view of a mold of the invention which can be used to form a nonlinear shaped article and constructed by stacking. The core of the shaped mold 20 is made up of several layers of honeycomb materials, 21a, 21b, and 21c. Similar to the mold 10 in FIG. 1, there are barrier shell component 22 including a lower facing sheet 25 and an exposed shell component 22a including an upper facing sheet 25a and a release layer 23 on the exposed surface 26 of the exposed shell component and, optionally, gaskets 24 to keep the liquid curable material within the mold 20. As previously discussed the layers of honeycomb may be individually faced with upper and lower facing sheets (not shown).

Figure 3:
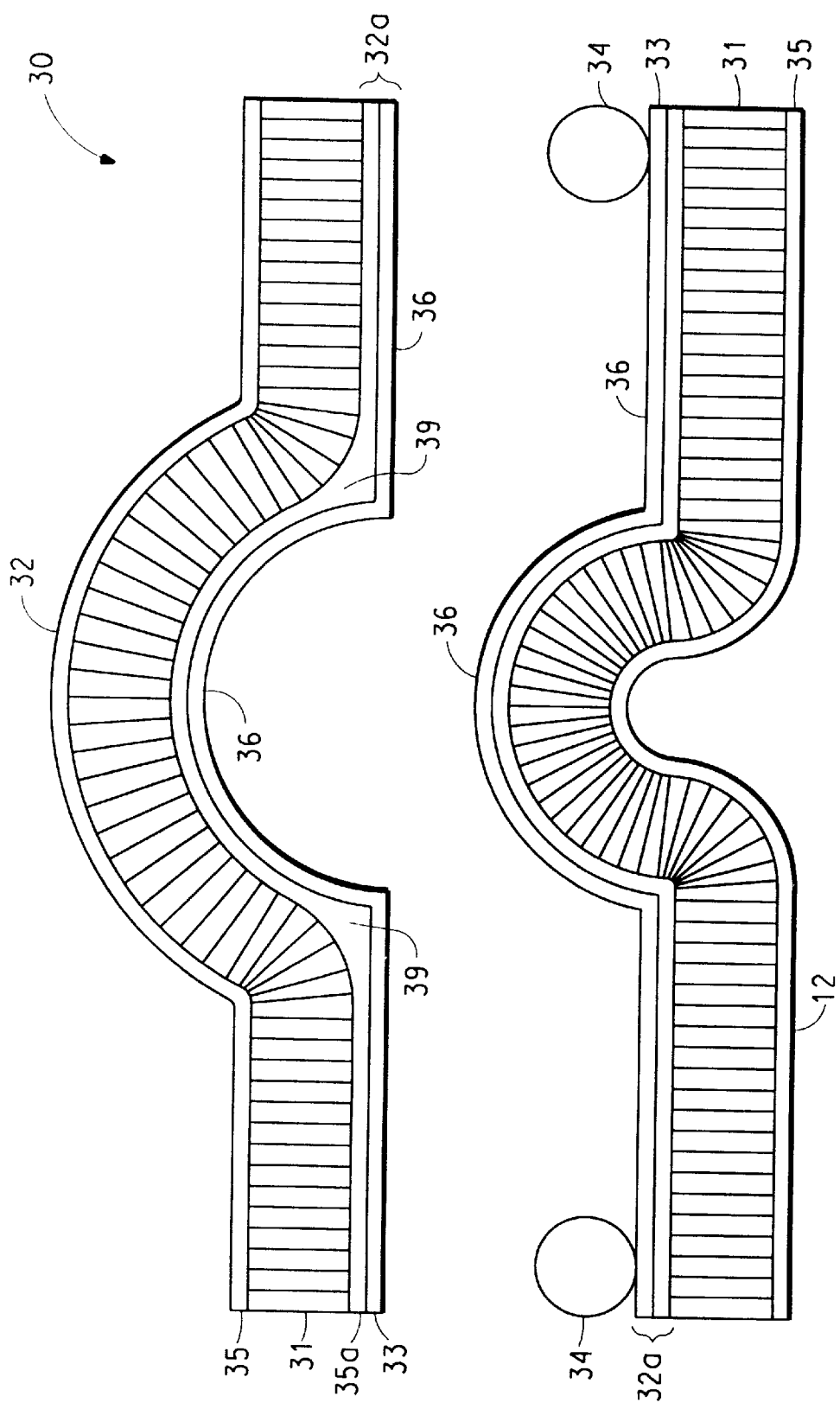
FIG. 3 is a cross-sectional view of a shaped mold made by vacuum-forming.

FIG. 3 shows a cross-sectional view of another shaped mold of the invention which is constructed by vacuum-forming. The shaped mold 30 includes a honeycomb core 31, barrier shell component 32 including a lower facing sheet 35, an exposed shell component 32a including a upper facing sheet 35a, a release layer 33 on the exposed surface 36 of the exposed shell component 32a, and, optionally, gaskets 34 to keep the liquid curable material within the mold 30. The release layer 33 is preferably a poly(vinyl) fluoride material, such as Tedlar® (available from E. I. du Pont de Nemours and Company), that has been thermoformed prior to mold construction. The mold may include extra resin in the space 39 between the exposed shell component 32a and the honeycomb core 31.

The release layer may be an integral part of the exposed facing sheet 12a, 22a, 32a. It is also possible to add a separate release film just prior to the addition of the chemically-curable composition. In general, this is accomplished by placing small holes or channels in the mold, from the upper shell through the corrugated core, to the lower shell. A vacuum can be pulled from the lower shell side of the channels to draw a release film down onto the surface of the upper shell.

It is known that gaskets 4, 24, 34 shown in the figures can be replaced by other forms of sealing methods. Commonly used sealing methods include, for example, placing resins such as silicon rubber about the periphery of upper component surface; and providing a cavity about the periphery of at least one of the upper component and allowing the liquid curable material to fill the cavity thereby providing a seal.

The use of faced honeycomb structures yields a self supporting mold without additional structural support. Although not wishing to be bound, it is believed that, in a faced honeycomb structure, the facings take the bending load (one facing in compression and the other in tension) or axial loads (compression of tension), and that the core takes the shear load, provides shear rigidity, and stabilizes the facings. The result is an extremely lightweight structure with the highest stiffness-to-weight and strength-to-weight ratios possible. Since the mold of the present invention is lightweight, it is easier to use than conventional molds. In addition, the mold is inexpensive to make so that it can be replaced often and even be used as a disposable mold.

The curable compositions that can be used with the molds of the invention include a chemically curable systems. Examples of suitable systems include polymerizable and/or crosslinkable systems such as vinyl compounds, particularly acrylics; polyesters; urethanes; epoxies; phenolics, including novolacs (novolac is also known as "novolak"); amino resins, including urea resins; and the like. Preferred curable compositions include epoxy resins, unsaturated polyester resins, and acrylic resins.

Epoxy resins useful in the present invention include those based on epoxide groups having certain reactivity. Such materials may include resins of bisphenol type A, bisphenol type F, phenol novolak type, alicyclic epoxy, halogenated epoxy, and cycloaliphatic epoxy resins.

Unsaturated polyester resins useful in the present invention include those wherein the reactivity is based on the presence of double or triple bonds in the carbon chain. Unsaturated polyester resins are formed by the reaction of molar amounts of unsaturated and saturated dibasic acids or anhydrides with glycols. The unsaturation sites can then be used to crosslink the polyester chains, via vinyl containing monomers such as styrene, into a thermoset plastic state.

Acrylic resins useful in the present invention are not particularly limited and include various kinds of conventional acrylic monomers, acrylic partial polymers, and other vinyl monomers and partial polymers for copolymerization with the acrylic component. (Meth)acrylic esters are preferred. The terms "(meth)acrylic" and "(meth)acrylate" are intended to mean "acrylic and/or methacrylic" and "acrylate and/or methacrylate", respectively. Examples of (meth) acrylic esters include methyl (meth)acrylate, ethyl (meth) acrylate, butyl (meth)acrylate, 2-ethylhexyl (meth)acrylate, benzyl (meth)acrylate, glycidyl (meth)acrylate, and the like.

The curable compositions may contain other materials such as fillers and additives. Examples of fillers include alumina trihydrate, alumina monohydrate, Bayer hydrate, silica, magnesium hydroxide, calcium carbonate, and barium sulfate. Examples of other additives include pigments, dyes, flame retardant agents, parting agents, fluidizing agents, viscosity control agents, curing agents, antioxidants, and the like, as is well known in the art. A preferred curable composition is an acrylic material including a poly (methyl methacrylate) resin with alumina trihydrate as a filler, which is suitable for forming solid surface materials. Such compositions have been described in, for example, U.S. Pat. Nos. 3,847,865 and 4,085,246, the contents of which are incorporated herein by reference.

The viscosity of the curable composition is often dictated by the composition and the end use of the cured material. The viscosity of the curable composition should be such that the curable composition is able to fill the mold space.

The method for making a cured article using the mold of the invention, comprises the steps of (a) placing a chemically curable composition on the mold; (b) allowing the composition to cure, wherein no heat is added to the composition or to the mold; and (c) removing the cured article from the mold.

In general, the components of the chemically-curable composition are mixed together just prior to placing the composition in or on the mold. If they are mixed together too far in advance, significant curing will take place with significant loss of heat to the environment. Thus it may be difficult to deliver the material to the mold. The physical properties of the cured article may also be deleteriously affected. The mixing can be accomplished by any convenient means, and mixing methods are well known in the art.

The mixed composition is then placed on or in a mold of the invention. Any system of delivery can be used for the placement step. Examples of suitable procedures include pouring, casting, injection, as in injection molding, extrusion, and others well known in the art. Two procedures useful in formulating articles from filled acrylic curable compositions are described in U.S. Pat. Nos. 3,488,246 and 3,642,975, the contents of which are incorporated herein by reference.

After the curable composition has been delivered to the mold of the invention, the composition is allowed to cure. No heat is added to the mold either before or during the curing process. The reaction is allowed to proceed under nearly adiabatic conditions. This results in rapid curing and complete curing. The final properties of the cured article are usually adversely affected by the amount of residual monomer in the system, so it is desirable to keep this to a minimum.

After curing, the cured article is removed from the mold. The article does not stick to the mold because of the release layer.

EXAMPLES

The following examples are illustrative of the invention, but not intended to be limiting.

Example 1

This example illustrates a mold for cell casting sheets. The material used to make the mold was Composite Sandwich 4122A1 from M. C. Gill Corp. (El Monte, Calif.). The composite sandwich had a 1 inch (2.54 cm) thick honeycomb core of Nomex® (E. I. du Pont de Nemours and Company, Wilmington, Del.) having a density of 3.0 lb/ft$^3$ (0.048 g/ml) and a cell diameter of 0.125 inches (0.3175 cm). The upper and lower facing sheets, forming a sandwich with the honeycomb core, were 2 plies of woven glass cloth impregnated with a phenolic resin. A release layer of 1.5 mil (38.1 microns) thick poly(vinyl)alcohol film was applied to the upper shell by vacuum. The heat capacity per unit area of the exposed shell component, including the upper facing sheet and the release layer, was 1,472 J/° K-m$^2$.

To construct the mold a sheet of sandwich 1 m×2 m in size was used. Wood blocks 1.27 cm high were placed along the length of each side to contain the curable composition. A release layer of 1.5 mil (38.1 microns) thick poly(vinyl) alcohol film was placed over the structure and drawn down by vacuum. The curable composition was then poured into this structure, covered with a second sheet of poly(vinyl) alcohol film and this covered by a second 1 m×2 m sheet of sandwich material.

Example 2

This example illustrates a shaped mold for cell casting shapes. Ten sheets of the composite sandwich material described in Example 1 were stacked and adhered together with cyanoacrylate adhesive between the layers by in a hydrolic platen press with light pressure until the adhesive cured. The cyanoacrylate adhesive used was "Super Jet" medium viscosity, professional grade cyanoacrylate, available from Carl Goldberg Models, Inc., of Chicago, Ill. The resulting block was machined to form the casting shape surface. The exposed core Nomex® cells were faced with Haprezz 3744 pre-mix of glass fibers and epoxy resin (available from Hapco, Inc., Hanover, Mass.) to a thickness of approximately 0.0625 inch (0.16 cm). This layer provided structural rigidity so the cells were not crushed in use. The fiberglass surface was then casted with a 0.25 inch (0.635 cm)-thick layer of silicone rubber, which acts as a release surface. The heat capacity per unit area of the exposed shell component, which included the upper facing sheet and the release layer, was 13,970 J/° K-m².

Example 3

This example illustrates a mold used as a casting belt. In this example, the composite sandwich structure described in Example 1 is used as a conveyor slider plate on a conveyor belt. The conveyor belt is a 24-inch (61 cm) Teflon® impregnated conductive belt from McMaster Carr (New Brunswick, N.J.). The slider plate is 24×10 inches (61×254 cm). 8-inch (20.3 cm) diameter pulleys are used on either side to make the conveyor belt continuous.

If an un-impregnated belt is used, the a layer of poly(vinyl)alcohol film can be fed continuously on the top and bottom of the belt to form a release layer.

Example 4

This example illustrates the use of the mold of the invention in the curing of a chemically curable composition. The curable composition used was a filled polymethylmethacrylate composition as described in U.S. Pat. No. 3,847,865. The mold used was that described in Example 1. A comparative (prior art) casting mold was made as described in Example 1, but using a 0.25 inch (0.64 cm) thick phenolic glass fiber reinforced circuit board material (woven fiberglass in phenolic resin), obtained from Spalding Fiber of Tonawanda, N.Y.).

The curable acrylic composition was poured into each mold and allowed to react for approximately 15 minutes without the addition of any heat. The cured material was then removed from the mold and the amount of residual monomer measured according to the test described below.

Residual Monomer Measurement

1. Sample was cryoground to a fine powder.
2. 1.000 g (±0.0002) of ground sample was weighed into a labeled screw capped vial.
3. 5 ml of tetrahydrofuran (THF) was added to vial. The vial was then sealed with a screw cap.
4. The sample vial was placed on a reciprocating shaker for 2 hours.
5. After extraction, the sample was filtered with a syringeless filter. The filtered solution was directly placed into an autosampler vial (2 ml). The autosampler vial was capped, crimped and labelled.
6. 10 microliters of the sample was placed in a HP 5890 Gas Chromatography unit (using Chemstation software), available from Hewlett Packard of Wilmington, Del.
   GC Conditions:
   Column: J&W Scientific, 30 m×0.53 mm DB-wax, 1 micrometer film thickness
   Initial Temp: 50° C.
   Initial Time: 6 min.
   Rate 1: 10° C./min.
   Final Temp: 170° C.
   Final Time: 2 min.
   Injector Temp: 200° C.
   FID Temp: 250° C.
   Helium Flow: 12.5 ml/min @ 10 psi
   Injector Volume: 1.0 microliter Peak area results generated by the software were used to calculate residual monomer.

The results are given below.

| | Mold Mass | Heat Capacity Per Unit Area of Upper Shell Component | Residual Monomer |
|---|---|---|---|
| Ex. 1 Mold | 5.37 | 1472 | 0.5 |
| Comparative Mold | 19.05 | 17,300 | 1.2 | mass in kg
heat capacity per unit area in J/° K-m²
residual monomer in weight %

Example 5

The R values were calculated for the mold of Example 1 and a comparative (prior art) mold made of 0.25 inch (0.635 cm) thick phenolic resin fiberglass. The calculations were carried out as described in Yound, Hugh D., *University of Physics*, p. 434, equation 15–25 (8th Ed. Addison-Wesley Publishing Co.). The R value for the mold of Example 1 was 0.354 m²-° K/W. The R value for the fiberglass mold was 0.015 m²-° K/W.

Of course, it should be understood that a wide range of changes and modifications can be made to the preferred embodiment described above. It therefore is intended that the foregoing detailed description be regarded as illustrative rather than limiting and that it be understood that it is the following claims, including all equivalents, which are intended to define the scope of this invention.

What is claimed is:

1. A method for making a cured article comprising:
   (a) placing a chemically curable composition on a mold, said mold comprising a composite structure including a first shell component having a surface exposed to the curable composition during a curing reaction, a second shell component, and a honeycomb core interposed between the first and second shell components; wherein the composite structure has a thermal resistance of at least 0.19 m²-° K/W and the first shell component does not absorb a significant amount of heat from the curing reaction;
   (b) allowing the composition to cure, wherein no heat is added to the composition or to the mold;
   (c) removing the cured article from the mold.

2. The method of claim 1 wherein the curable composition includes methyl(meth)acrylate and wherein the first shell component having an heat capacity per unit area of less than about 14,500 J/km².

3. The method of claim 2 wherein the heat capacity per unit area of the first shell component is less than about 6000° K-m².

4. The method of claim 2 wherein the heat capacity per unit area of the first shell component is less than about 6000° K-m².

5. The method of claim 2 wherein the heat capacity per unit area of the first shell component is less than about 1400° K-m².

6. The method of claim 1, wherein the mold is a cell for making sheet materials.

7. The method of claim 1, wherein the mold is a movable belt for the continuous casting of the chemically curable composition into sheets.

8. The method of claim 1 wherein the first shell component has a thickness of between about 0.1 mm and about 1.5 mm and the core component has a thickness of between about 0.5 cm to about 3.81 cm.

9. The method of claim 1 wherein the core has a cell size of less than about 38 mm.

10. The method of claim 1 wherein the exposed shell component comprises a material selected from the group consisting of woven or nonwoven polyaramid fabric, woven or nonwoven fiberglass fabric, woven or nonwoven polyaramid fabric impregnated with epoxy resin, woven or nonwoven polyaramid fabric impregnated with phenolic resin, woven or nonwoven polyaramid fabric impregnated with epoxy resin, woven or nonwoven fiberglass fabric impregnated with phenolic resin, and combinations thereof.

11. The method of claim 1 wherein the honeycomb core comprises a material selected from polyaramid, paper or combinations thereof.

12. The method of claim 1 wherein the first cell comprises a release material that includes a layer of a material selected from the group consisting of silicone, silicone rubber, polyethylene, poly(vinyl chloride), poly(vinyl fluoride), poly(vinyl alcohol), PET and fluoropolymer.

13. A method for chemical curing a composition in an essentially adiabatic environment, comprising: providing a mold having a first exposed shell component having a surface exposed to the curable composition during a curing reaction, a barrier shell component, and a honeycomb core interposed between the first exposed shell component and the barrier shell component, wherein the mold has a thermal resistance of at least about 0.19 $m^2$-° K/W and the first exposed shell component does not absorb a substantial amount of heat from the curing reaction; and curing the composition.

14. The method of claim 13 wherein the curable composition includes methyl(meth)acrylate and wherein the first exposed shell component having an heat capacity per unit area of less than about 14,500 J/° K-$m^2$.

15. The method of claim 14 wherein the heat capacity per unit area of the first exposed shell component is less than about 8000 J/° K-$m^2$.

16. The method of claim 14 wherein the heat capacity per unit area of the first exposed shell component is less than about 6000 J/° K-$m^2$.

17. The method of claim 14 wherein the heat capacity per unit area of the first exposed shell component is less than about 1400 J/° K-$m^2$.

18. The method of claim 13 wherein the mold is a shaped mold.

19. The method of claim 18 wherein the shaped mold includes:
   a first composite ply including the first exposed shell component and a first honeycomb core;
   a last composite ply including a last honeycomb core and a last barrier shell component;
   the first composite ply being stacked adjacent to the last composite ply such that the first barrier shell component is adjacent to the last exposed shell component;
   the stacked composite plies defining a shape opening therein.

20. The method of claim 19 wherein the shaped mold further includes at least one additional ply between the first composite ply and the last composite ply, the additional ply including at least one additional honeycomb core.

21. The method of claim 20 wherein the additional ply further includes at least one shell component adjacent to the additional honeycomb core.

22. The method of claim 19 wherein the stacked plies of the shaped mold are joined together with an adhesive.

23. The method of claim 19 wherein the mold is made by a method selected from the group consisting of vacuum bagging, vacuum forming, autoclaving, compression molding and combinations thereof.

24. The method of claim 19 wherein the exposed surface of the exposed shell component includes a release surface.

25. The method of claim 24 wherein the release surface comprises a layer of a material selected from the group consisting of silicone, silicone rubber, polyethylene, poly(vinyl chloride), poly(vinyl fluoride), poly(vinyl alcohol), PET and fluoropolymer.

26. The method of claim 13 wherein the first exposed shell component comprises a material selected from the group consisting of woven or nonwoven polyaramid fabric, woven or nonwoven fiberglass fabric, woven or nonwoven polyaramid fabric impregnated with epoxy resin, woven or nonwoven fiberglass fabric impregnated with phenolic resin, woven or nonwoven fiberglass fabric impregnated with epoxy resin, woven or nonwoven fiberglass fabric impregnated with phenolic resin, and combinations thereof.

* * * * *